United States Patent
Tumminaro et al.

(10) Patent No.: US 9,595,861 B2
(45) Date of Patent: Mar. 14, 2017

(54) POWER SWITCHING CONVERTER

(71) Applicant: STMicroelectronics S.r.l., Agrate Brianza (IT)

(72) Inventors: Salvatore Tumminaro, Marianopoli (IT); Andrea Rapisarda, Motta S. Anastasia (IT); Alfio Pasqua, Piedimonte Etneo (IT); Marco Sammartano, Petrosino (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 78 days.

(21) Appl. No.: 14/754,995

(22) Filed: Jun. 30, 2015

(65) Prior Publication Data

US 2015/0303816 A1    Oct. 22, 2015

Related U.S. Application Data

(63) Continuation-in-part of application No. 14/644,290, filed on Mar. 11, 2015.

(30) Foreign Application Priority Data

Mar. 31, 2014  (IT) .............................. MI2014A0559

(51) Int. Cl.
| | |
|---|---|
| *H02M 1/08* | (2006.01) |
| *H02M 3/335* | (2006.01) |
| *H02M 1/00* | (2006.01) |

(52) U.S. Cl.
CPC ......... *H02M 1/08* (2013.01); *H02M 3/33523* (2013.01); *H02M 2001/0006* (2013.01);
(Continued)

(58) Field of Classification Search
CPC ............ H02M 3/335; H02M 3/33515; H02M 3/33525; H02M 3/3376; H02M 2001/0035; Y02B 70/16
(Continued)

(56) References Cited

U.S. PATENT DOCUMENTS

| | | |
|---|---|---|
| 7,450,402 B2 | 11/2008 | Jitaru |
| 7,463,497 B2 | 12/2008 | Negrete |

(Continued)

FOREIGN PATENT DOCUMENTS

EP    2639951 A2    9/2013

OTHER PUBLICATIONS

IT Search Report and Written Opinion for IT MI2014A000559 dated Dec. 22, 2014 (10 pages).

*Primary Examiner* — Gary L Laxton
*Assistant Examiner* — Kyle J Moody
(74) *Attorney, Agent, or Firm* — Gardere Wynne Sewell LLP

(57) ABSTRACT

A circuit includes a transformer with a primary, secondary, and auxiliary. A first control circuit actuates a first switch circuit based on a wake-up signal to cause the primary to transmit power to the secondary. A second control circuit actuates a second switch circuit based on an output voltage at the secondary being less than a threshold to generate the wake-up signal to the secondary for transmission to the auxiliary. The second switch circuit has a transistor with a source coupled to a reference node, a gate coupled to the second control circuit. A first diode has an anode coupled to the source and a cathode coupled to the drain, and blocks flow of current from the drain to the source. A second diode has an anode coupled to the substrate and a cathode coupled to the drain, and blocks flow of current from the drain to the substrate.

15 Claims, 8 Drawing Sheets

(52) U.S. Cl.
CPC ............... *H02M 2001/0009* (2013.01); *H02M 2001/0035* (2013.01); *Y02B 70/16* (2013.01)

(58) Field of Classification Search
USPC ....... 363/21.14, 21.17, 89, 21.06, 52, 55, 84
See application file for complete search history.

(56) References Cited

U.S. PATENT DOCUMENTS

| | | |
|---|---|---|
| 7,471,522 B2 | 12/2008 | Ng et al. |
| 8,570,772 B2 | 10/2013 | Morris et al. |
| 8,873,254 B2 | 10/2014 | Morris et al. |
| 8,953,342 B2 | 2/2015 | Fang |
| 9,413,246 B2 | 8/2016 | Luo et al. |
| 2013/0250627 A1* | 9/2013 | Herfurth ............ H02M 3/3376 363/21.15 |
| 2015/0303816 A1 | 10/2015 | Tumminaro et al. |
| 2015/0318777 A1 | 11/2015 | Pasqua et al. |
| 2016/0043647 A1 | 2/2016 | Rapisarda et al. |
| 2016/0181932 A1* | 6/2016 | Kikuchi ............ H02M 3/33592 363/21.07 |

\* cited by examiner

POWER SWITCHING CONVERTER

PRIORITY CLAIM

This application is a continuation in part of U.S. patent application Ser. No. 14/644,290 filed on Mar. 11, 2015, which claims priority from Italian Patent Application No. MI2014A000559 filed on Mar. 31, 2014, the disclosures of which are incorporated by reference.

TECHNICAL FIELD

The present disclosure relates to a power switching converter, and particularly to a DC-DC switching converter. More specifically, present disclosure relates to power switching converters providing a constant current to a load, for example a battery, with high efficiency. The present disclosure more particularly relates to a switched voltage and current regulator whose load should be isolated from the supply source of the regulator, frequently the 220-volt mains.

BACKGROUND

A conventional power switching converter is a flyback converter wherein a transformer with a primary winding and a secondary winding is provided for isolating the load from the voltage source. The primary winding is connected to the voltage source through a power switch while the secondary winding is connected to a load by means of a diode and a filtering capacitor is connected in parallel to the load.

When the power switch switches-on, a first current flows on the primary winding and increases from an initial value as a function of the values of the voltage source and of the inductance provided by the primary winding. During this time, no current flows on the secondary winding because the diode is reverse biased and the power is stored in the core of the transformer.

When the switch switches-off, the current on the primary winding is abruptly switched-off and the power that was just stored in the core is transferred into the secondary winding. A second current on the secondary winding abruptly reaches a peak value equal to the peak current reached by the first current multiplied by the ratio between the number of turns of the primary winding and the secondary winding, when the switch is switched-off. The second current starts to decrease as a function of the inductance of the secondary winding and of the voltage across the load.

The amount of power transferred from the primary winding to the secondary winding depends upon the switching duty cycle of the switch. For this purpose, the power switching converter comprises a control circuit for driving the switch, while the control circuit is configured to receive a feedback signal to modify the width of the control pulses of the switch.

The feedback control is provided by means of an optocoupler or an auxiliary winding. In the latter case, the auxiliary winding gives an image of the output voltage, being directly in phase with the secondary winding.

In conditions of light load the power switching converter is typically made to operate in a burst-mode. With this operating mode the converter operates intermittently, with series (bursts) of switching cycles separated by time intervals during which the converter does not switch (idle time). When the load is such that the converter has just entered burst-mode operation, the idle time is short. As the load decreases, the duration of the bursts decreases as well and the idle time increases. In this way, the average switching frequency is considerably reduced and, consequently, the switching losses associated with the parasitic elements in the converter and the conduction losses related to the flow of reactive current in the transformer are reduced. The duration of the bursts and the idle time are determined by the feedback loop so that the output voltage of the converter remains under control.

In the case wherein the feedback of the output voltage is formed by the auxiliary winding, the minimum frequency of the burst-mode operation is determined by the control circuit of the switch. During the burst-mode operation, the control circuit periodically forces the switching-on of the switch with a certain "restart" frequency in order to receive the feedback signal.

Thus, the power switching converter provides a fixed power which is independent from the load. This power is to be dissipated to avoid a situation where under low or zero load the converter goes out of regulation. To this purpose, a dummy load is typically used.

That power to dissipate mainly depends on the "restart" frequency, which should not be chosen too low. In fact, during the time period between two subsequent commutations of the switch, the control circuit is not able to respond to an eventual variation of the load at the output terminal. When a commutation of the switch occurs, the converter responds by providing to the load the required power.

In the worst case, when a variation of the load from zero to a maximum value occurs, the current absorbed by the load is supported by the output capacitor and the voltage drop of the output voltage depends on the value of the capacitance of the output capacitor (the higher the output capacitance, the lower the voltage drop), on the "restart" frequency (the lower the frequency, the higher the voltage drop) and on the maximum output current. A trade-off between burst-mode consumption and the value of the output capacitor is involved during the design phase of the power switching converter.

However, to obtain acceptable power dissipation values a relatively low "restart" frequency is chosen, which means a choice of an excessive output capacitance.

To overcome this drawback, one approach is to use a wake up circuit configured to force the switching-on of the switch when a variation of the load occurs between two subsequent commutations during the burst-mode. This allows low power consumption without using a large output capacitor. However, other issues may arrive. Therefore, additional development in this area is needed.

SUMMARY

One aspect of the present disclosure is to provide a switching power converter with a wake up circuit and a demagnetization detector.

One aspect of the present disclosure is a circuit including a transformer having a primary winding, a secondary winding, and an auxiliary winding. A first switch circuit is coupled in series between the primary winding and a first reference node. A second switch circuit is coupled in series between the secondary winding and a second reference node. A first control circuit is coupled to the auxiliary winding and configured to actuate the first switch circuit in response to receipt of a wake-up signal so as to cause the primary winding to transmit power to the secondary winding to thereby provide a regulated output signal. A second control circuit is configured to actuate the second switch circuit in response to an output voltage at the secondary winding being less than a threshold value so as to generate the wake-up signal to the secondary winding for transmission to the auxiliary winding. The second switch circuit includes a power transistor having a drain, a source coupled to the second reference node, a gate coupled to the second control circuit, and a substrate. The second switch circuit also includes a first diode having an anode coupled to the source of the power transistor and a cathode coupled to the drain of the power transistor, the first diode configured to block flow of current from the drain of the power transistor to the source of the power transistor. A second diode has an anode coupled to the substrate of the power transistor and a cathode coupled to the drain of the power transistor, the second diode configured to block flow of current from the drain of the power transistor to the substrate of the power transistor.

Another aspect is directed to a circuit including a transformer having a primary winding, a secondary winding, and an auxiliary winding. A first switch circuit is coupled in series between the primary winding and a first reference node. A second switch circuit is coupled in series between the secondary winding and a second reference node. A first control circuit is coupled to the auxiliary winding and configured to actuate the first switch circuit in response to receipt of a wake-up signal so as to cause the primary winding to transmit power to the secondary winding to thereby provide a regulated output signal. A second control circuit is configured to actuate the second switch circuit in response to an output voltage at the secondary winding being less than a threshold value so as to generate the wake-up signal to the auxiliary winding for transmission to the auxiliary winding. The second switch circuit includes a PMOS transistor having a drain coupled to the secondary winding of the transformer, a source coupled to a node, and a gate. The second switch circuit also includes a DMOS transistor having a drain coupled to the node, a source coupled to the second reference node, and a gate coupled to the second control circuit. A current source is coupled to the second reference node, and a third switch is coupled between the current source and the gate of the PMOS transistor and configured to be actuated by the second control circuit.

A further aspect is directed to a circuit including a transformer having a primary winding, a secondary winding, and an auxiliary winding. A first switch circuit is coupled in series between the primary winding and a first reference node. A second switch circuit is coupled in series between the secondary winding and a second reference node. A first control circuit is coupled to the auxiliary winding and configured to actuate the first switch circuit in response to receipt of a wake-up signal so as to cause the primary winding to transmit power to the secondary winding to thereby provide a regulated output signal. A second control circuit is configured to actuate the second switch circuit in response to an output voltage at the secondary winding being less than a threshold value so as to generate the wake-up signal to the auxiliary winding for transmission to the auxiliary winding. The second control circuit includes a comparison circuit configured to compare a signal from the secondary winding to a reference signal to determine when the output voltage is less than the threshold value, and a signal generator configured to actuate the second switch circuit after determination by the comparison circuit that the output voltage is less than the threshold value.

BRIEF DESCRIPTION OF THE DRAWINGS

For a better understanding of the present disclosure, a preferred embodiment thereof is now described, purely by way of non-limiting example and with reference to the annexed drawings, wherein.

DETAILED DESCRIPTION

One or more embodiments in accordance with the principles of the present disclosure will be described below. These described embodiments are only examples of techniques to implement the disclosure, as defined solely by the attached claims. Additionally, in an effort to provide a focused description of the disclosure and the principles of the disclosure, irrelevant features of an actual implementation may not be described in the specification.

Figure 1:
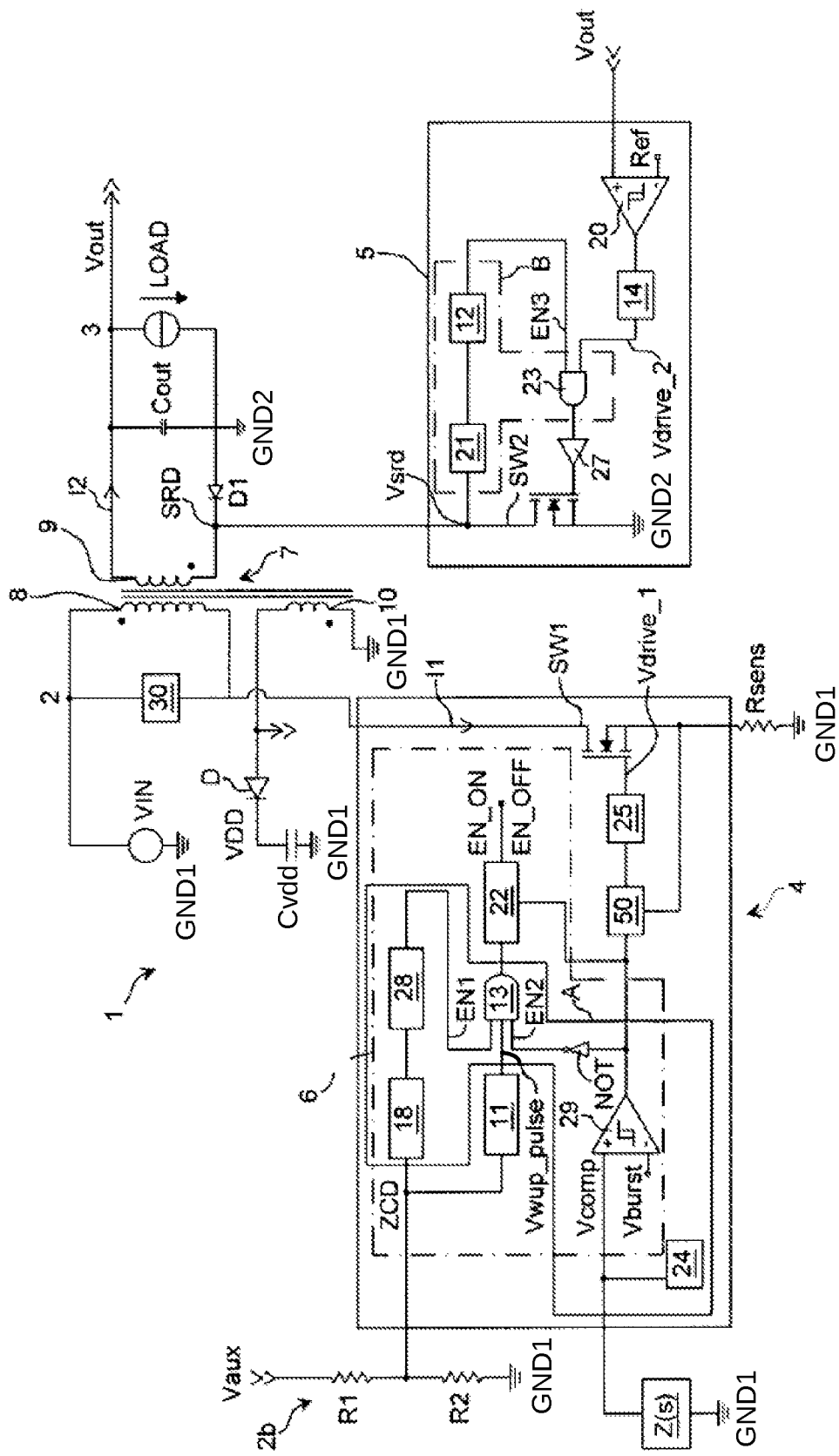
FIG. 1 is a block diagram of a switching power converter according to the present disclosure.

FIG. 1 illustrates a switching converter 1 according to the present disclosure. The switching converter 1 comprises an input terminal 2 configured to receive an input signal Vin, and an output terminal 3 configured to provide a regulated output signal Vout for supplying a load LOAD. For example, the input signal Vin is a rectified mains voltage (110V or 220V).

The power converter 1 then comprises a switch SW1 coupled to the input terminal 2, and a control circuit 4 configured to drive the switch SW1 for regulating the input signal Vin and providing at the output terminal 3 the regulated output signal Iout, Vout. More particularly, the switch SW1 is a power Mosfet with its drain terminal coupled with the input terminal 2, its source terminal connected with a sensing resistor Rsens, and its gate terminal connected to the control circuit 4.

The power converter 1 is a so-called flyback converter comprising a transformer 7 with a primary winding 8 coupled with the input terminal 2, a secondary winding 9 coupled with the output terminal 3, and an auxiliary winding 10 coupled with the control circuit 4. In particular, the primary winding 8 is arranged between the input terminal 2 and the drain terminal of the power Mosfet SW1, and the secondary winding 9 is arranged between the output terminal 3 and the cathode of a rectification diode Dl having its anode connected to a ground reference GND2. Preferably a snubber circuit 30 is arranged in parallel with the primary winding 8.

An output capacitor Cout is also connected in parallel to the load LOAD.

The auxiliary winding 10 provides the supply voltage to the control circuit 4 by means of a capacitor Cvdd which sets a voltage VDD, the capacitor Cvdd being coupled with the auxiliary winding 10 through a diode D. At the same time, the auxiliary winding 10 is directly in phase with the secondary winding 9, giving an image of the output signal Vout. The voltage across the auxiliary winding 10 is thus proportional to the voltage across the secondary winding 9.

The control circuit 4 is configured to provide a control signal Vdrive_1 to drive the switch SW1 by processing a feedback voltage Vaux, which is the voltage across the auxiliary winding 10.

The control circuit 4 (FIG. 2, 3) comprises a pulse width modulation (PWM) circuit 50 configured to generate, through a driver 25 directly connected to switch SW1, the control signal Vdrive_1. The circuit 50 (FIG. 2) receives from a block 51 a signal representative of the zero cross of the voltage Vaux and may receive a reset signal in response to the comparison between the voltage Vsense across the resistance Rsens and a voltage Vcomp, which is an error voltage Verror across an impedance Z(s). The error voltage Verror is due to the comparison between the feedback voltage Vaux and a predetermined voltage Vref. The reset signal is sent to the circuit 50 when the error voltage Verror is equal to or higher than the voltage Vsens. More particularly, the error voltage Verror is due to the comparison between a sampled voltage Vzcd, which is proportional to the voltage Vaux, and the predetermined voltage Vref. The circuit 50 also receives a restart signal from a block 52.

In operation, when control circuit 4 switches-on the switch SW1, a first current I1 flows through the primary winding 8 and increases from an initial value as a function of the values of the input signal Vin and of the inductance provided by the primary winding 8. During this time, no current flows through the secondary winding 9 because the diode Dl is reverse biased and the power is stored in the core of the transformer 7.

When control circuit 4 switches-off the switch SW1, the current flowing through the primary winding 8 is abruptly switched-off and the power that was just stored in the core is transferred into the secondary winding 9. A second current I2 flowing through the secondary winding 9 abruptly reaches a peak value equal to the peak current reached by the first current I1 multiplied by the ratio between the number of turns of the primary winding 8 and the secondary winding 9, when the switch SW1 is switched-off. The second current I2 starts to decrease as a function of the inductance of the secondary winding 9 and of the load LOAD.

At the presence of light or zero load LOAD, the switching converter 1 operates in burst-mode. In order to receive the information regarding the output signal Vout, that is the feedback voltage Vaux, the control circuit 4 periodically forces the switching-on of the switch SW1 with a certain restart frequency. Thus, the power switching converter 1 provides a fixed power which is independent from the load LOAD which needs to be dissipated to avoid the converter 1 going out of regulation.

During the time period between two subsequent switching-on of the switch SW1, the control circuit 4 is not able to respond to an eventual variation of the load LOAD. When a commutation of the switch SW1 occurs, the converter 1 responds by providing the required power to the load LOAD. To this purpose, the switching converter 1 comprises a wake up circuit 5, 6 configured to force the switching-on of the switch SW1, when the power converter 1 enters in a burst-mode, for detecting the output signal Vout.

The wake up circuit 5, 6 (FIG. 1) comprises a transmitting section 5, coupled to the output terminal 3, and a receiving section 6, coupled to the control circuit 4. The transmitting section 5 is configured to provide a wake up signal Vaux_pulse to the receiving section 6 in a wireless way when the output signal Vout falls below a prefixed threshold value Ref.

The receiving section 6 comprises a first enabling circuit A configured to enable the transfer of the wake up signal Vaux_pulse from the transmitting section 5 to the control circuit 4 when the switch SW1 is off and after a first time period T_mask from the final time instant of the demagnetization t_burst of the transformer 7.

This is explained by the fact that the last switching-off time instant of the switch SW1, after which the switching converter 1 enters in burst-mode, is followed by a series of voltage fluctuations on the auxiliary winding 10 due to the power exchange between the magnetization inductance of the transformer 7 and the parasitic capacitance Cpdrain in the drain terminal of the power Mosfet SW1. The voltage fluctuations have similar characteristics to the wake up signals Vaux_pulse and can be interpreted by the control circuit 4 as a series of wake up signals Vaux_pulse which could activate the switching-on the switch SW1. This is an undesired event because further power could be provided to the load LOAD causing an uncontrolled increase of the output signal Vout.

For this reason, it is important that the first time period T_mask is set by the first enabling circuit A such that the voltage fluctuations amplitude on the auxiliary winding 10 have a suitable value that is not detectable by the control circuit 4.

The transmitting section 5 comprises a second enabling circuit B configured to provide the wake up signal Vaux_pulse to the receiving section 6 after a second time period T_inhibit from the final time instant of the demagnetization t_burst of the transformer 7, the second time period T_inhibit being greater than the first time period T_mask.

In fact, if during the first period of time T_mask an increasing of the output signal Iout occurs, the control circuit 4 would be not able to detect the wake up signal Vaux_pulse. For this reason, the second enabling circuit B has to wait for a period of time greater than the first time period T_mask to provide the wake up signal Vaux_pulse to the receiving section 6, in order that it is correctly detected by the control circuit 4.

Thus, when the output signal Vout falls below a prefixed threshold value Ref, the second enabling circuit B sends the wake up signal Vaux_pulse after the second time period T_inhibit. The time period T_inhibit is greater than the first time period T_mask.

Figure 2:
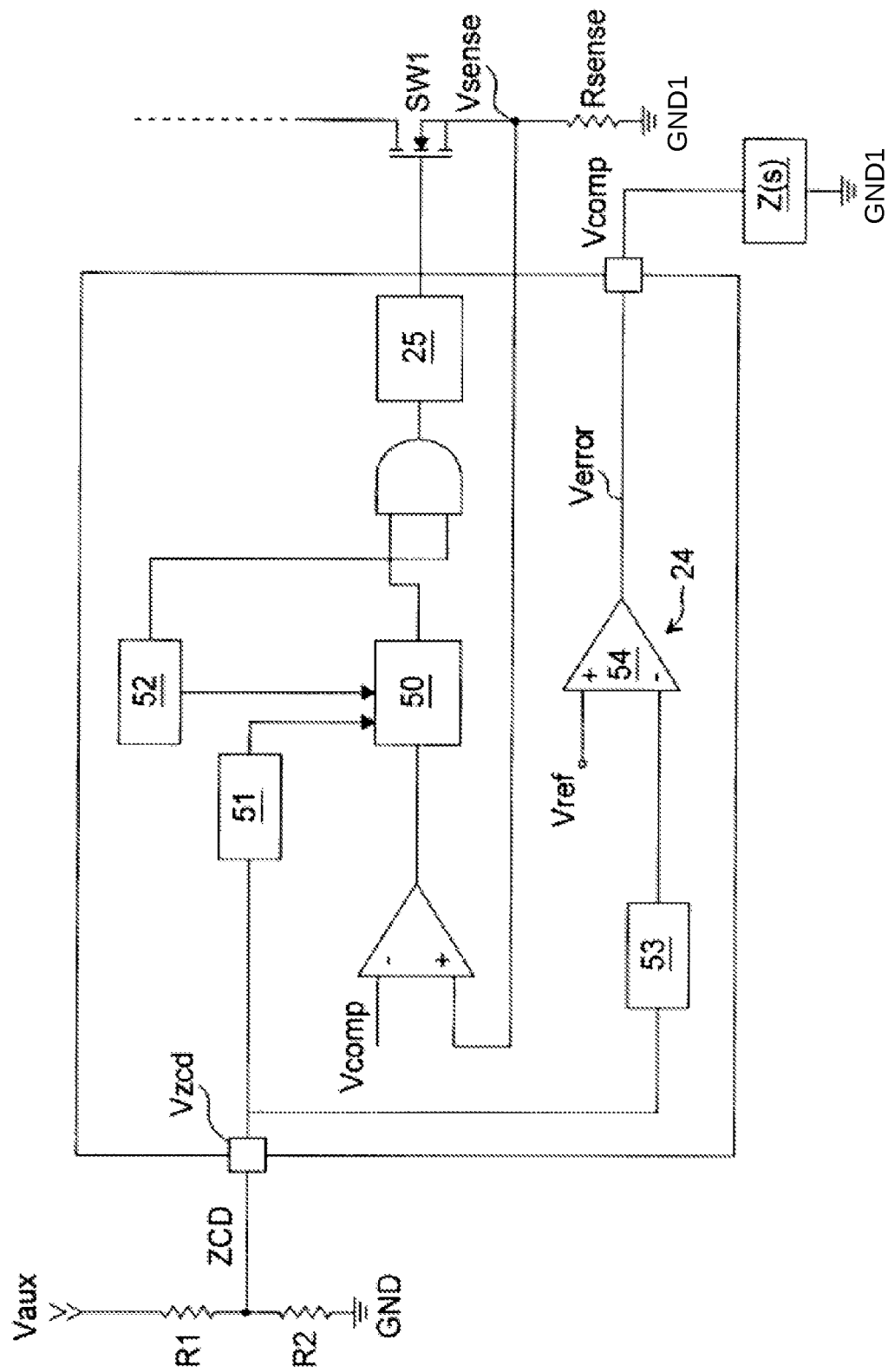
FIG. 2 is a first particular of the block diagram of FIG. 1.

The first enabling circuit A comprises a first detector 18 cascaded with a first signal generator 28. The first detector 18 is coupled to the auxiliary winding 10 and is configured to detect the demagnetization of the transformer 7 through the feedback voltage Vaux across the auxiliary winding 10 and to define the time instant t_burst, that is the initial time instant of the time period T_mask, as the final time instant of the demagnetization of the transformer 7. In particular, the first detector 18 is connected to a pin ZCD which is the output terminal of a voltage divider 26 comprising resistors R1, R2 arranged in parallel to the auxiliary winding 10 and is the input terminal of the zero-cross detector (FIG. 2). Thus, the voltage Vzcd detected by the first detector 18 is proportional to the feedback voltage Vaux.

The first signal generator 28 is configured to generate a first enabling signal EN1 after the first time period T_mask from the time instant t_burst.

Furthermore, the first enabling circuit A comprises a first voltage comparator 29, coupled with the auxiliary winding 10 and configured to compare the voltage Vcomp with a voltage reference Vburst and generate, as a result of the comparison, a second enabling signal EN2. Preferably, the first voltage comparator 29 is a hysteresis voltage comparator. Particularly, the voltage Vcomp (FIG. 2) is provided by a comparison circuit 24 comprising a sample and hold circuit 53 configured to sample the voltage Vzcd, and a comparator 54 configured to perform the comparison between the sampled voltage Vzcd and the predetermined voltage Vref and provide, as a response, the error voltage Verror across the impedance Z(s), which is the voltage Vcomp.

Finally, the first enabling circuit A comprises an AND logic gate 13 which has at its inputs the first enabling signal EN1, the second enabling signal EN2 and a wake up pulse Vwup_pulse. The wake up pulse Vwup_pulse is a signal provided by a wake up detector 11, coupled with auxiliary winding 10, as a response to the detection of the wake up signal Vaux_pulse. The second enabling signal EN2 is provided to the AND logic gate 13 by means of a Not logic gate cascaded to the first voltage comparator 29.

The AND logic gate 13 is configured to provide the wake up pulse Vwup_pulse to a driving section 22 connected to the control circuit 4 at the presence of the enabling signals EN1 and EN2. The driving section 22 preferably provides a disabling signal EN_OFF to turn off the circuits comprised in the control circuit 4, which do not play an active part during the burst-mode operation of the switching converter 1, and an enabling signal EN_ON to turn on said circuits during the typical switching operation.

The transmitting section 5 comprises a second voltage comparator 20 and a further switch SW2 coupled between the secondary winding 9 and the ground reference GND2. The voltage comparator 20 is configured to compare the output signal Vout with the prefixed threshold value Ref and, if the output signal Vout is lower than the prefixed threshold value Ref, to generate by means of a pulse generator 14 a driving signal V_drive2 suitable to switching-on the further switch SW2.

The second enabling circuit B comprises a second detector 21 cascaded with a second signal generator 12, the second detector 21 being coupled with the secondary winding 9 and configured to detect the demagnetization of the transformer 7 through the voltage across the secondary winding 9 and define the time instant t_burst of the switch SW1 in the same way of the detector 18. In particular, the second detector 21 detects a voltage Vsrd at a terminal SRD, which is voltage the across the secondary winding 9.

Figure 3:
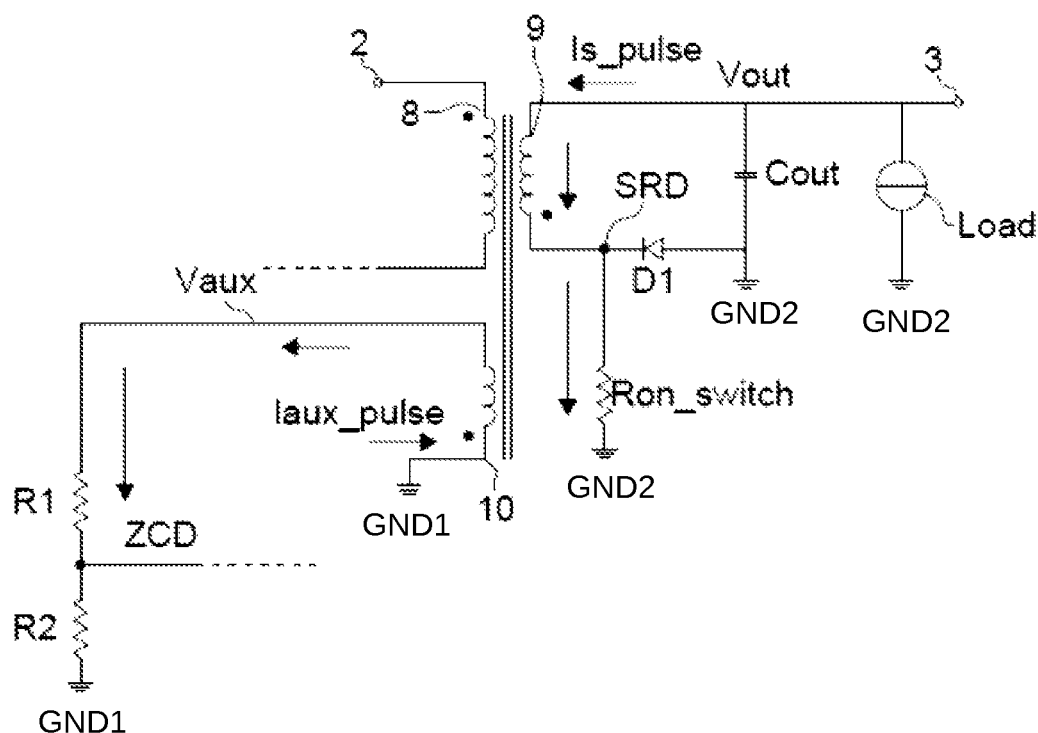
FIG. 3 is a second particular of the block diagram of FIG. 1.

The second signal generator 12 is configured to generate a third enable signal EN3 after the second time period T_inhibit, and to provide it to an AND logic gate 23 which has at its inputs the third enable signal EN3 and the driving signal V_drive2. The AND logic gate 23 is configured to enable the providing of the driving signal V_drive2 to the further switch SW2. For example, the further switch SW2 is a power Mosfet with its drain terminal connected with the secondary winding 9, its source terminal connected with the ground reference GND2, and its gate terminal connected with a voltage buffer 27 by means of which the driving signal V_drive2 is received (FIG. 3).

Figure 5:
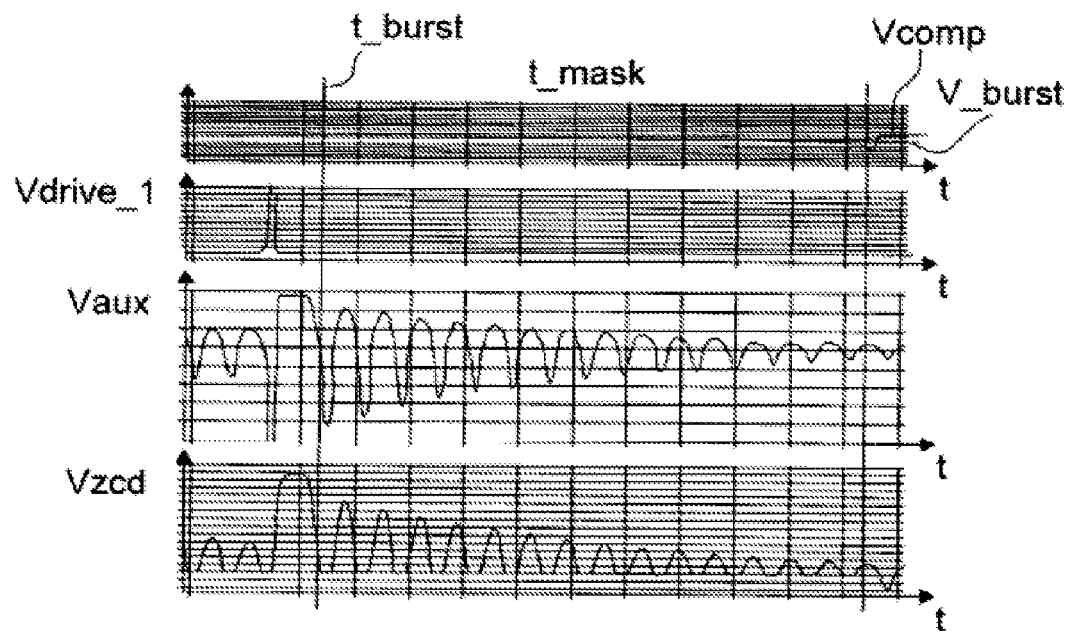
Figure 6:
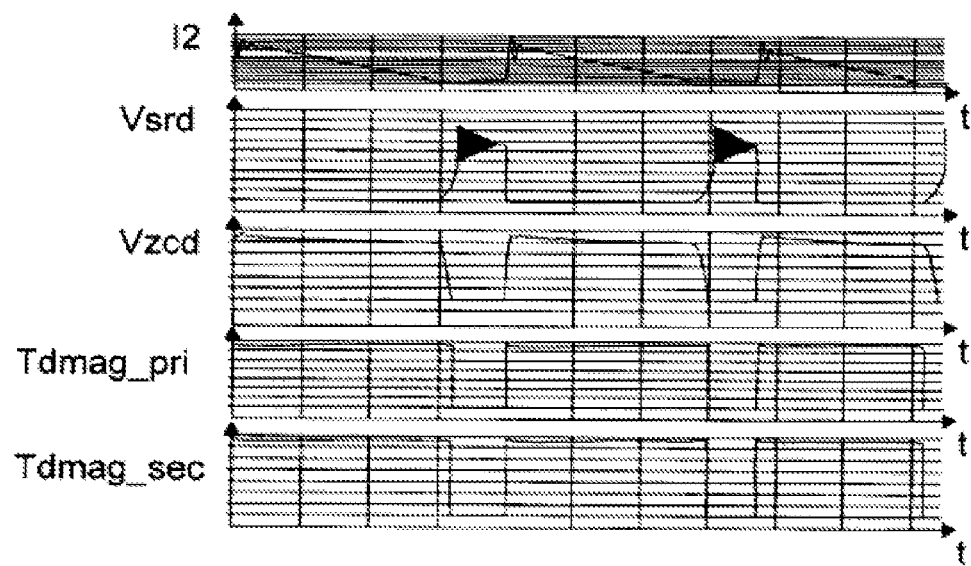

In operation, both the first 18 and second 21 detectors detect and process the voltage across the auxiliary winding 10 and the second winding 9 respectively, and generate a first logic signal Tdmag_pri and a second logic signal Tdmag_sec, respectively (FIG. 6). Preferably, the first Tdmag_pri and the second logic signal Tdmag_sec are high during the demagnetization phase of the transformer 7 and low during the magnetization phase. Due to their nature, the first Tdmag_pri and the second logic signal Tdmag_sec are synchronized and they are used for determining the starting instant for the counting of the first time period T_mask in the receiving section 6 and of the second time period T_inhibit in the transmitting section 5, when the switching converter 1 enters in burst mode. The starting instant coincides with the time instant t_burst (FIG. 5).

In particular, the first signal generator 28 sets the first time period T_mask to "0" when the first logic signal Tdmag_pri is high, and the first time period T_mask to "1" when the first logic signal Tdmag_pri is low. In the same way, the second signal generator 12 sets the second time period T_inhibit.

When the power switching converter 1 enters in burst mode (when the voltage Vcomp is lower than the voltage reference Vburst) the first Tdmag_pri and the second logic signal Tdmag_sec are both low for a time greater than the first T_mask and the second time period T_inhibit, respectively (FIGS. 5, 6). After the first time period T_mask, the first signal generator 28 enables the wake up pulse Vaux_pulse reception, while, after the second time period T_inhibit, the second signal generator 12 enables the sending of the wake up pulse Vaux_pulse. Thus, the second enabling circuit B waits for a period of time greater than the first time period T_mask to provide the wake up signal Vaux_pulse to the receiving section 6, in order that it be detected by the wake up detector 11.

Figure 4:
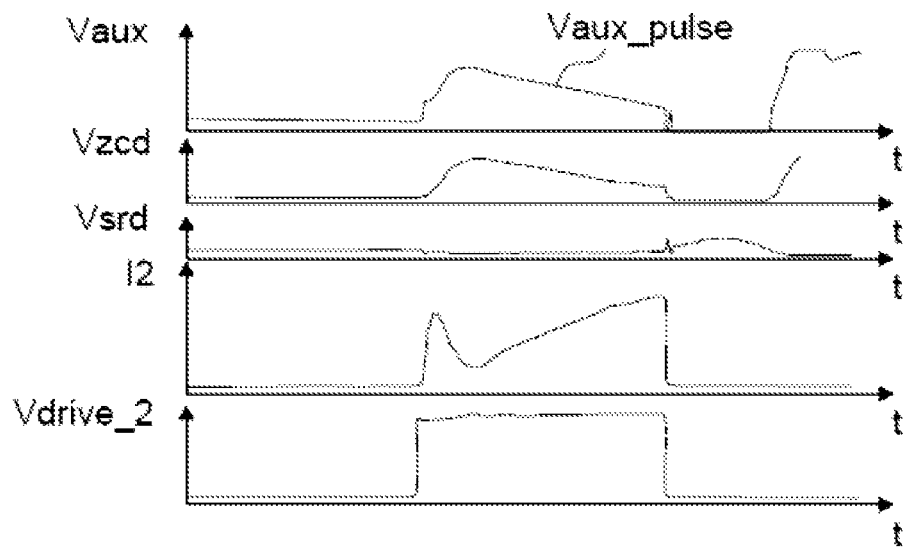
FIG. 4-6 are time diagrams showing the signals in play in the switching power converter.

If during the burst-mode operation, the output signal Vout falls below a prefixed threshold value Ref, the second enabling circuit B sends the wake up signal Vaux_pulse after the second time period T_inhibit from the switching-off time instant t_burst which is greater than the first time period T_mask (FIG. 4). In particular, the AND logic gate 23 provides the driving signal V_drive2 suitable to switch-on the further switch SW2. The wake up signal Vaux_pulse is an inducted voltage across the auxiliary winding 10 due to an inducted current pulse Iaux_pulse generated by the flowing of a current Is_pulse in the secondary winding 9 (FIGS. 3, 4).

The transfer of the wake up signal Vaux_pulse through the transformer 7 in combination with the synchronization between the receiving 6 and the transmitting sections 5 of the wake up circuit allows an optimization of the time of response of the receiving 6 when variations of the load LOAD, and as a result, an optimization of the power dissipation.

During the demagnetization phase of the transformer 7, the voltage Vsrd at the node SRD assumes negative values on the order of −2V to −3V. As explained, the switch SW2 is a power MOSFET. Therefore, during the demagnetization phase of the transformer 7, the voltage Vsrd being negative at the drain of the switch SW2 serves to turn off the device. However, negative values at the drain of the switch SW2 can serve to turn on the parasitic junctions between the drain and substrate, and between the drain and source. These parasitic junctions may then conduct currents on the order of hundreds of milliamperes. These currents can ultimately lead to malfunctions from the substrate not being at a common ground with other components, or from trigger latch-up mechanisms that actually damage the switch SW2. In addition, these parasitic junctions could affect the dynamic performance of the diode Dl.

To help avoid the situation where these parasitic junctions turn on, the switch SW2 as shown in FIG. 1 may be replaced with the switch circuit SW2' of FIG. 7, which will now be described. Here, a power transistor T has a source coupled to a ground node GND2, and a gate coupled to the transmitting section 5 through the buffer 27 to receive the signal WU. A diode Dsd is a parasitic diode formed by the source-drain junction of the power transistor T, and thus is considered to have an anode coupled to the source of the power transistor T and a cathode coupled to the drain of the power transistor T. The diode Dsd serves to block flow of current from the drain of the power transistor T to the source thereof. A diode Dsub is a parasitic diode formed by the substrate-drain junction of the power transistor T, and thus is considered to have an anode coupled to the substrate of the power transistor T and a cathode coupled to the drain of the power transistor T. The diode Dsub serves to block flow of current from the drain of the power transistor T to the substrate thereof. A diode Ds has an anode coupled to the secondary winding 9 of the transformer 7 and a cathode coupled to the drain of the power transistor T. Since the diodes Dsd/Dsub and Ds are back to back, current will not flow in an undesired direction in any condition, and therefore the turning on of the parasitic junctions is prevented.

The power transistor T may be a metal oxide semiconductor field effect transistor (MOSFET), or a double diffused metal oxide semiconductor (DMOS) transistor.

Figures 7, 8:
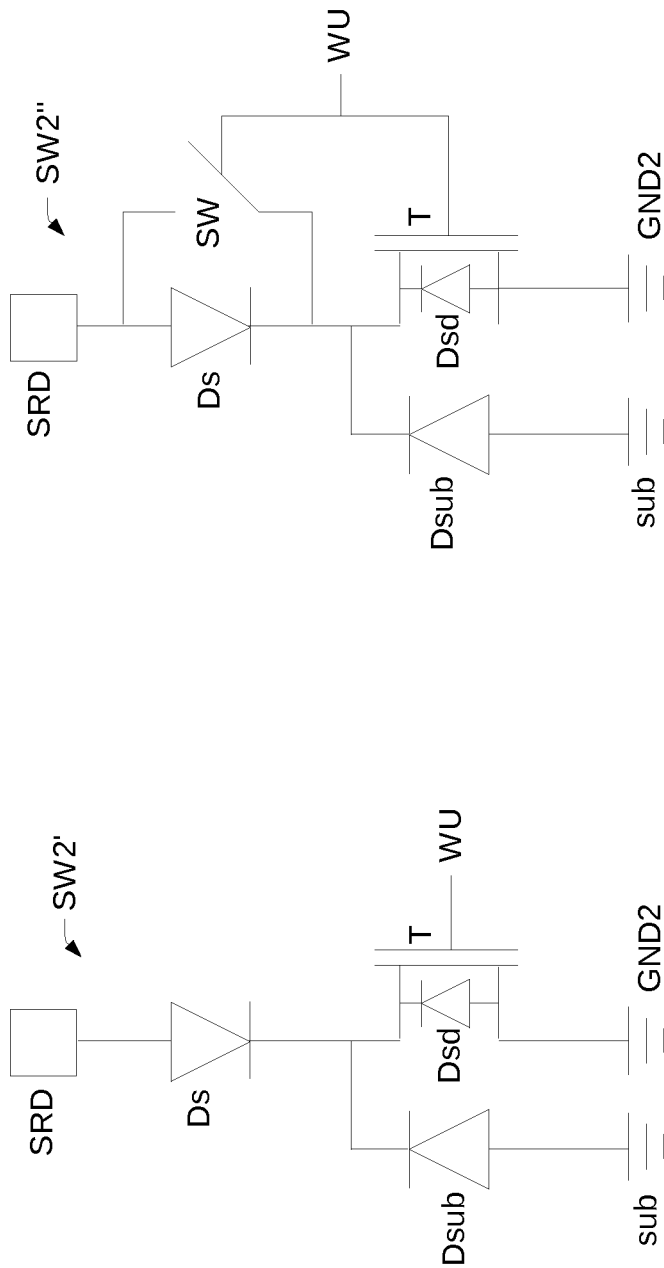
FIG. 7 is a schematic diagram of an embodiment of the second switch of FIG. 1.
FIG. 8 is a schematic diagram of another embodiment of the second switch of FIG. 1.

The switch circuit SW2' shown in FIG. 7 is suitable for mixed implementation where the power transistor T is integrated together with its parasitic diodes Dsd, Dsub, while the diode Ds is a discrete component. This switch circuit SW2' of FIG. 7 is not, however, suitable for a completely integrated implementation.

For example, if the diode Ds were formed from the base-emitter junction of a NPN transistor, during the demagnetization phase of the transformer 7, the collector-substrate junction of the NPN transistor would be directly polarized, and thus the drain to substrate junction of the power transistor T could turn on. As another example, if the diode Ds were formed from the base-emitter junction of a PNP transistor, current could end up being injected into the substrate of the power transistor T through the parasitic emitter-base-substrate when the power transistor T is turned on, causing the substrate to not be at a common ground with other components.

If a fully integrated implementation is desired, the switch circuit SW2'' shown in FIG. 8 can be used. The switch circuit SW2'' of FIG. 8 is similar to the switch circuit SW2' of FIG. 7, except a switch SW is coupled across the diode Ds. The switch SW actuated simultaneously with the power transistor T by signal WU, such that when the power transistor T is switched on, the current from the node SRD flows through the switch SW and bypasses the diode Ds. Thus, where the diode Ds is formed from the base-emitter junction of a PNP transistor, the current will flow through the switch SW and thereby prevent injection of current into the emitter-base-substrate of the power transistor T when the power transistor T is turned on. This remains true if the switch SW is dimensioned with a resistance between its terminals Rswon such that the drop between its terminals is less than the turn on voltage of the diode Ds. Thus, the function served by the diode Ds is to prevent the diodes Dsd and Dsub from going into a conduction mode. Since Ds will not enter into conduction, the size thereof can be small.

In addition to being suitable for fully integrated implementation, the switch circuit SW2'' of FIG. 8 is likely to occupy less area than the switch circuit SW2' of FIG. 7. The equivalent resistance of the diode Ds in the switch circuit SW2' of FIG. 7 and the switch SW in the switch circuit SW2'' of FIG. 8 are represented by the drain to source resistance of the power transistor T when conducting Rdson and by the resistance between the terminals of the switch Rswon. In the switch circuit SW2' of FIG. 7, Ds will be sized based upon the current Iwu flowing through it. For a given current Iwu, the turn on voltage Vdson of the diode Ds affects the dimensioning and area of the power transistor T, as well as the drain to source resistance Rdson thereof. Mathematically represented:

$$Rdson = Rswon - \frac{Vdson}{Iwu}$$

and the area occupied by the switch circuit SW2' of FIG. 7 will be:

$$A = At(Rdson) + Ads(Iwu)$$

The area of the power transistor T will be the same in the circuits of both FIGS. 7 and 8, and thus to achieve the same Ron for both circuits, the switch SW is dimensioned with a Rswon equal to the equivalent resistance of Ds when the current Iwu flows therethrough.

The area occupied by the switch circuit SW2 of FIG. 8 will thus be:

$$A = At(Rdson) + Asw(Rswon)$$

Since SW will be made from an active components, Asw will be less than Ads, and thus the area occupied by the switch circuit SW2'' of FIG. 8 is less than the area occupied by the switch circuit SW2' of FIG. 7. Indeed, the switch SW can ideally be made from a P-channel MOS with a low Rdson per unit area. The P-channel of the switch SW should be in a well able to withstand the maximum value of Vsrd (and thus the maximum voltage at node SRD). When the switch SW is off, when Vsrd falls to a negative voltage, the voltage across the switch SW depends on the value previously reached by the drain of the power transistor T at the end of the transition. In this case, the voltage across the switch SW may exceed the absolute maximum rating voltage and damage the component. To prevent this issue, it is useful to control the excursion of the drain of the power transistor T during negeaitve transitions of the voltage Vsrd, so that the node SRD follows the voltage Vsrd, discharging the parasitic capacitance Cp1. Therefore, a resistor may be inserted at the heads of the switch SW (in parallel therewith). This has the drawback of a current draw from the substrate when the voltage Vsrd is a negative voltage (through the Dsd and Dsub parasitic diodes), but this current is limited by design and does not cause the problems previously described.

An implementation of the switch circuit SW2''' using bipolar CMOS DMOS (BCD), together with its parasitic components, is now described with reference to FIG. 9. The switch circuit SW2''' includes a DMOS transistor T having a drain coupled to node N2, a source coupled to the ground GND2, and a gate coupled to receive the signal WU.

The PMOS transistor SW has a source coupled to the secondary winding of the transformer 7 via node N1, a drain coupled to node N2, a gate coupled to node N3, and a body coupled to node N2. A resistor Rp is coupled between node N1 and N2. A switch SWc is coupled between node N3 and a current source Ion, which is in turn also coupled to the reference node GND2. The switch SWc is actuated by the signal WU A junction transistor T2 has an emitter coupled to the secondary winding of the transformer 7 via node SRD, a collector coupled to the substrate SUB of the DMOS transistor T, and a base coupled to node N2. Although the transistor T2 is shown as a discrete component, it should be understood that it is a parasitic component of the PMOS transistor SW formed from the source-drain-substrate junction thereof.

A diode Dsub has an anode coupled to the collector of the junction transistor T2 and a cathode coupled to the base of the junction transistor T. A capacitor Cp1 is formed by the base-collector junction of the junction transistor T2. A parasitic diode Ds is also formed by the emitter-base unction of the junction transistor T2, and has an anode coupled to the emitter of the junction transistor T and a cathode coupled to the base of junction transistor T. Although the diode Ds is shown as a discrete component, it should be appreciated that physically, the diode Ds is part of the base emitter junction of the junction transistor T2. A parasitic diode Dsd formed from the source-drain junction of the DMOS transistor T has cathode coupled to the drain of the transistor T, and an anode coupled to the source of the transistor T.

Figure 9:
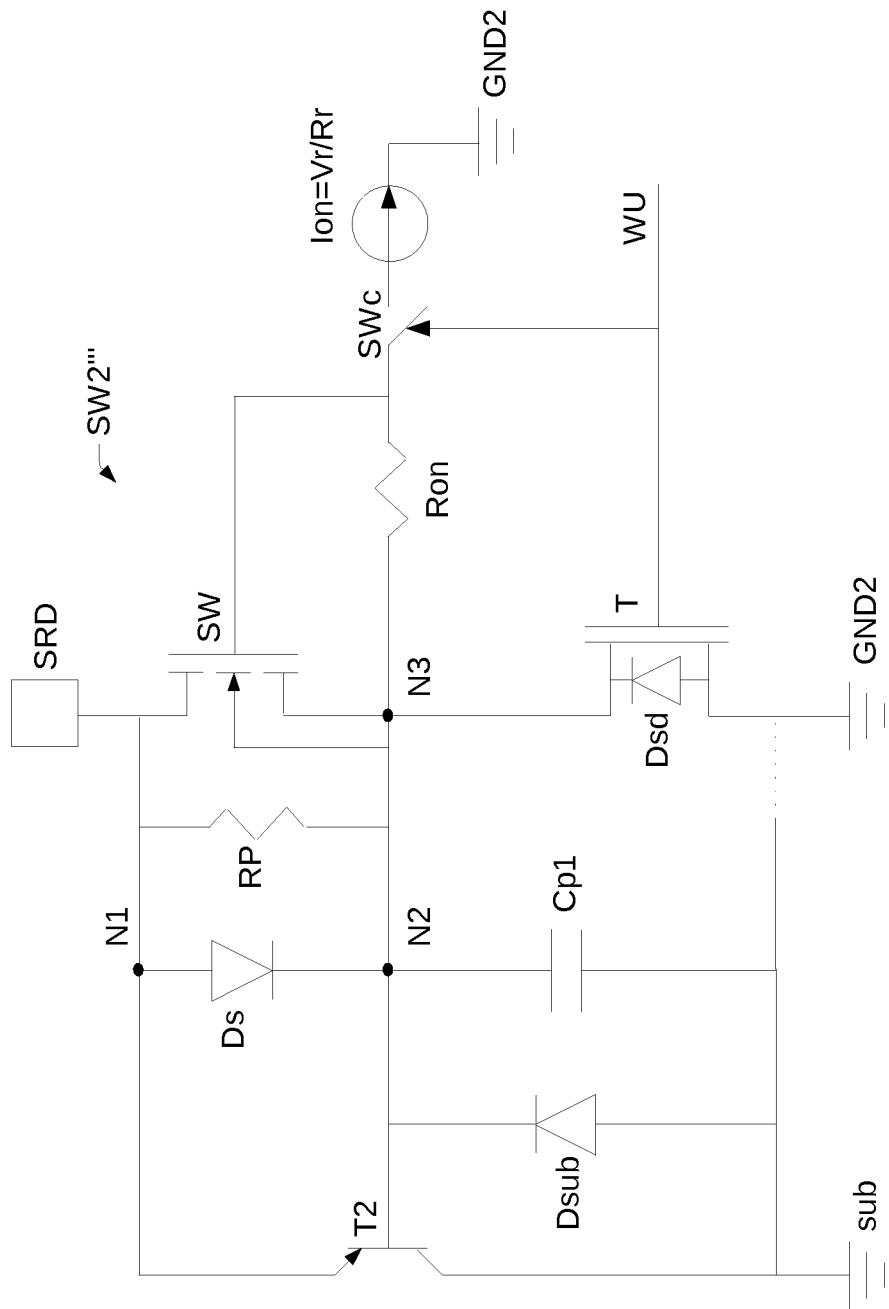
FIG. 9 is a schematic diagram of a further embodiment of the second switch of FIG. 1.

Steady state operation of the switch circuit SW2 of FIG. 9 is now described. When the value of WU is at 0V, the DMOS transistor T is off. Since SWc is actuated by WU, it remains open, and thus the transistor SW also remains off, and no current flows through Ron. When Vsrd is 0, the drain to source voltage of the transistor SW is at 0V and the voltage at node N2 is thus equal to Vsrd. When Vsrd falls below zero, the node N2, due to Rp, follows node SRD until it reaches the turn on voltage of Dsd and Dsub.

During to the rising edge of WU, the DMOS transistor T turns on, and the switch SWc is closed. Node SRD is discharged to the turn on voltage of the base-emitter junction of the junction transistor T2 if this turn on voltage is less than the threshold voltage of the PMOS transistor SW, or to the turn on voltage of the PMOS transistor SW if the turn on voltage of the base-emitter junction of the junction transistor T2 is greater than the threshold voltage of the PMOS transistor SW.

During a falling edge of Vsrd, node N2 follows node SRD, discharging through Rp. During a rising edge of Vsrd, node N2 follows node SRD, with a difference in voltage therebetween being the voltage drop across Ds. The junction transistor T2 will operate in active mode, and current emitted from the base of the junction transistor T2 will charge the capacitor Cp1. Neglecting the amount of charge from Cp1 that passes through resistor Rp, the energy lost during the falling edge will be equal to the energy stored on Cp1 multiplied by the gain of the junction transistor T2. Stated mathematically:

$$Ew = \beta \frac{1}{2} Cp1 * V^2 srd$$

If the transistor SW turns on before the transistor T, the node SRD will discharge through the transistor SW. If the transistor T turns on before the transistor SW, the node SRD will discharge through the base-emitter junction of the junction transistor T2, with a portion of the discharge current being injected into the substrate of the transistor SW, having the deleterious effects discussed above. Therefore, it is desirable for the transistor SW to turn on after the switch SWc is closed, so that the discharge is through the transistor SW.

Figure 10:
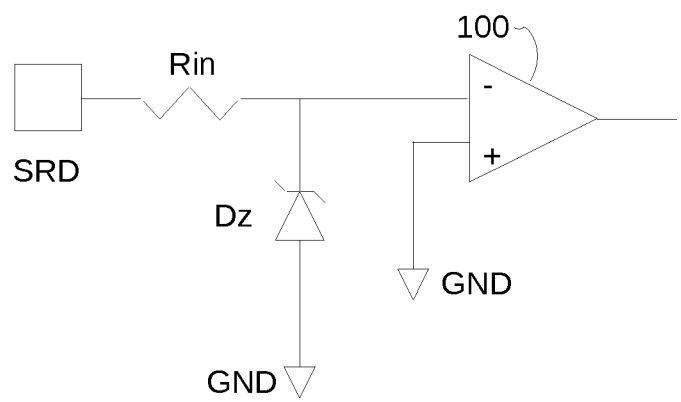
FIG. 10 is a schematic diagram of an embodiment of the second detector of FIG. 1.

Various possible implementations of the second detector 21 are now described. A first embodiment of the second detector 21 is first described with reference to FIG. 10. Here, the second detector 21 includes a comparator 100 having a non-inverting terminal coupled to the secondary winding 9 through an input resistor Rin, an inverting terminal coupled to the reference node GND2, and an output terminal coupled to the second signal generator 12. A zener diode Dz has a cathode coupled to the non-inverting terminal of the comparator 100 and an anode coupled to the reference node GND2. The input resistor Rin is on the order of tens of MΩ. The zener diode Dz serves to limit the voltage input fed from node SRD to the non-inverting terminal of the comparator 100, while the input resistor Rin serves to limit the current flowing into the zener diode Dz.

In operation, the comparator 100 compares the voltage at node SRD to ground. When the voltage at node SRD is less than ground, the comparator 100 outputs a logic high to the second signal generator 12.

Figure 11:
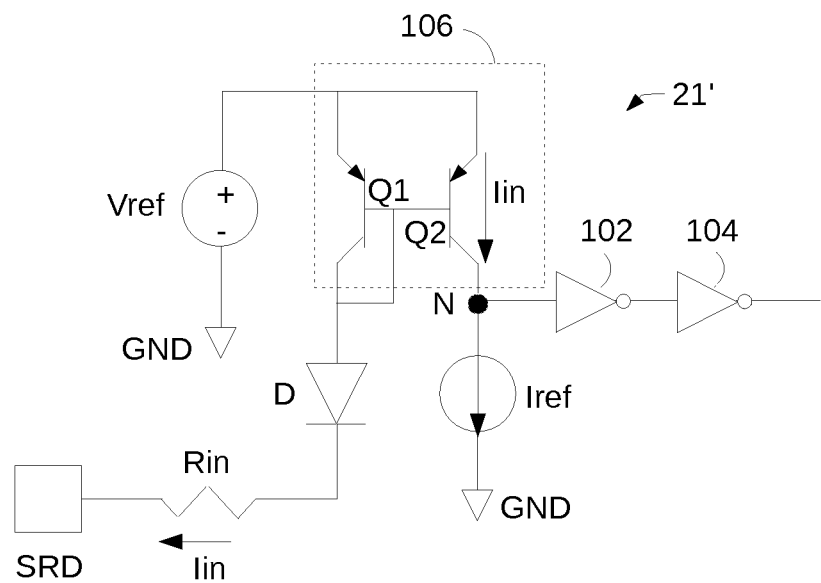
FIG. 11 is a schematic diagram of another embodiment of the second detector of FIG. 1.

While this detector 21 serves the desired purposes, the size of the input resistor Rin renders this design difficult to implement for a fully integrated implementation. Therefore, as will now be described with reference to FIG. 11, an embodiment that does not involve the use of an input resistor Rin with a resistance as high is now described.

Here, the second detector 21' includes a comparison node N coupled to the second signal generator 12. A current mirror 106 has an input coupled to node SRD via an input resistor Rin and diode D, and an output coupled to the comparison node N. A current generator Iref draws a reference current Iref from the comparison node. First and second inverters 102, 104 in series at the comparison node N couple the comparison node N to the second signal generator 12.

The current mirror 106 includes a first PNP junction transistor Q1 having an emitter coupled to a reference signal node, a base, and a collector coupled to the base. A second PNP junction transistor Q2 has an emitter coupled to the reference signal node, a base coupled to the base of the first PNP junction transistor Q1, and a collector coupled to the comparison node.

In operation, during the demagnetization phase of the transformer 7, an input current Iin based on the voltage at node SRD is pulled through the first PNP junction transistor Q1, into the diode D, through the input resistor Rin, and into node SRD. This input current Iin is mirrored through the second PNP junction transistor Q2 and into the comparison node N. The reference current generator Iref draws the reference current Iref from the comparison node, thereby subtracting the reference current Iref from the input current Iin. When the voltage at the node SRD is less than ground, a positive current will be output from the comparison node N to the inverters 102, 104, thus outputting a logic high to the second signal generator 12.

So that this detector 21' properly detects the point at which the voltage at the node SRD drops below ground, the diode D, reference current generator Iref, and input resistor Rin are dimensioned such that:

$$I_{ref} = \frac{Vref - Vdon - Vbeon}{Rin}$$

where Vdon is a voltage across the diode when it is forward biased, and where Vbeon is the base-emitter voltage of the first PNP junction transistor Q1.

When the transformer 7 is in the magnetization phase, the voltage at node SRD is positive, and the diode D is reversed biased and does not conduct. To use this design in a fully integrated implementation, the diode D would have a breakdown voltage greater than the maximum voltage to be seen at node SRD, which could be on the order of 60V-120V. The use of the drain to source junction of a DMOS transistor to form the diode D would be unsuitable because current would be injected into the substrate which would alter the desired condition described by the equation above, rendering design of the second detector 21' so as to provide the desired output to be difficult.

Figure 12:
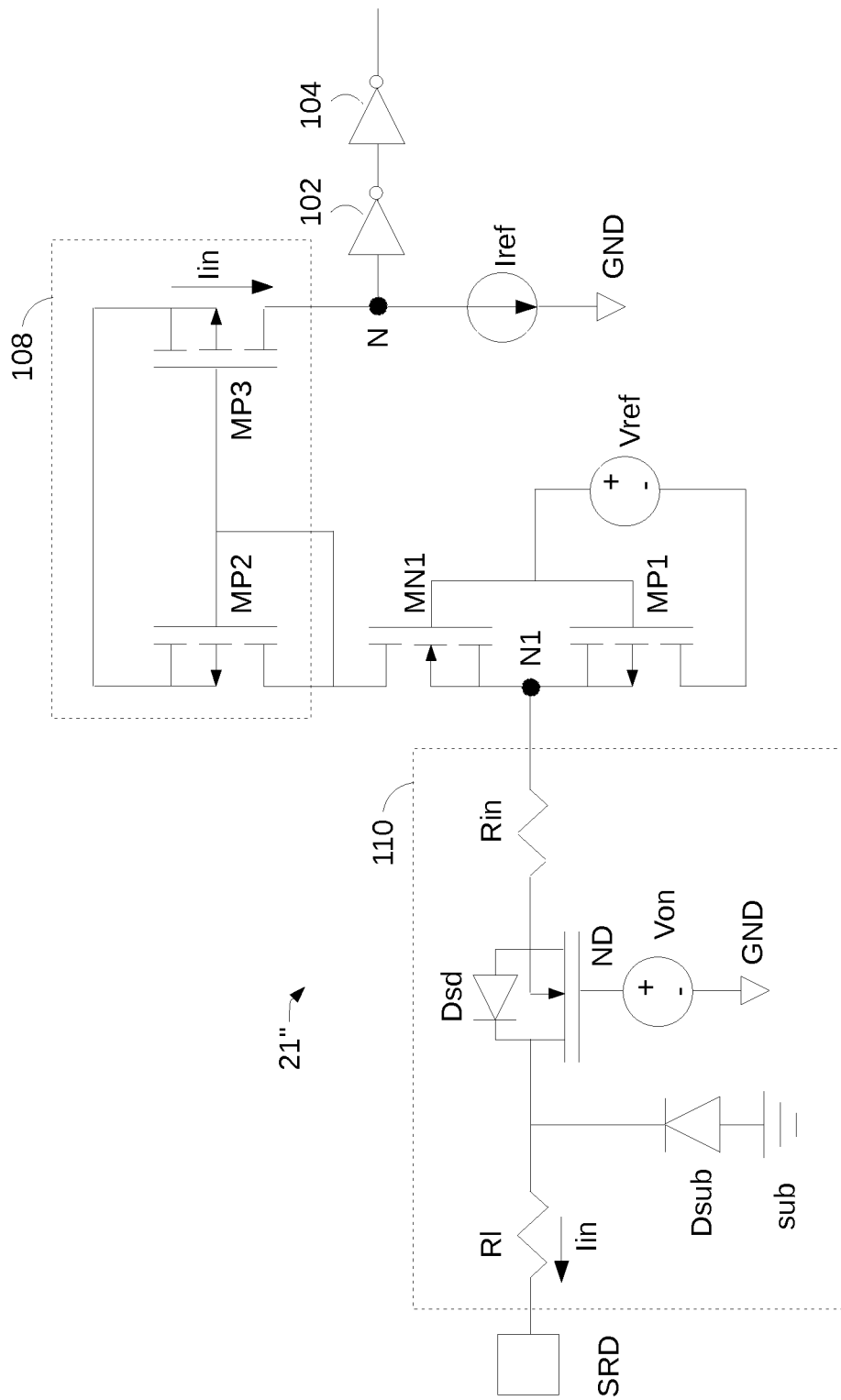
FIG. 12 is a schematic diagram of a further embodiment of the second detector of FIG. 1.

A design of the second detector 21" that would provide the desired output is now described with reference to FIG. 12. Here, the second detector 21" includes a secondary winding circuit 110 that sinks an input current Iin based upon the voltage at node SRD. A current mirror 108 mirrors the input current Iin to a comparison node N coupled to the second signal generator 12. A current generator Iref draws a reference current related from the comparison node N.

The secondary winding circuit 110 includes a limiting resistor R1 coupled to node SRD. A DMOS transistor ND has a drain coupled to node SRD through the limiting resistor R1, a source coupled to node N1 through the input resistor Rin, and a gate coupled to a turn-on voltage sufficient to turn the DMOS transistor ND on. A diode Dsd has an anode coupled to the source of the DMOS transistor ND and a cathode coupled to the drain of the DMOS transistor ND, and a diode Dsub has a cathode coupled to the drain of the DMOS transistor ND and an anode coupled to the substrate of the DMOS transistor ND. Dsd and Dsub are parasitic diodes formed in the junctions of the DMOS transistor ND, similarly to as has been explained above.

A first NMOS transistor MN1 has a drain coupled to the current mirror 108 to draw therefrom the input current Iin, a source coupled to node N1, and a gate coupled to a reference signal node Vref to receive the reference signal. A first PMOS transistor MP1 has a source coupled to node N1, a drain coupled to the reference node GND2, and a gate coupled to the reference node Vref.

The current mirror 108 includes a second PMOS transistor MP2 having a source coupled to a supply node Vdd, a drain coupled to the drain of the first NMOS transistor NM1, and a gate coupled to the drain of the second PMOS transistor MP2. A third PMOS transistor MP3 has a source coupled to the supply node Vdd, a drain coupled to the comparison node N, and a gate coupled to the gate of the second PMOS transistor MP2. Inverters 102, 104 are coupled in series between the comparison node N and the second signal generator 12.

In operation, when the transformer 7 is in the demagnetization phase, the node SRD draws the input current Iin from node N1, through the input resistor Rin, and pushes the current through the limiting resistor R1 into node SRD. The input resistor Rin serves to limit the current flowing through the DMOS transistor ND. The limiting resistor R1 serves to limit current through the diode Dsub, particularly during the transient resulting when the diode Dsub is switched on.

The first NMOS transistor MN1 draws from the current mirror 108 the input current Iin. The current mirror 108 then mirrors this input current Iin to the comparison node N at its output. The reference current source Iref draws a reference current related to the reference signal from node N, leaving, when the voltage at the secondary winding 9 is less than ground, a positive current to flow through the inverters 102, 104, indicating a logic high to the second signal generator 12.

Mathematically represented, the input current drawn into node SRD is:

$$Iin = \frac{Vref - Vgs1 - Vsrd}{Rin}$$

where Vgs1 is the gate to source voltage of the transistor MN1.

So that the second detector 21" outputs a logic high when the voltage at node SRD falls below zero, the input resistor and DMOS transistor ND are sized such that the following relationship is satisfied:

$$Iref = \frac{Vref - Vgs1}{Rin}$$

This second detector 21" allows the generation of Iout as proportional to the voltage at node SRD, while maintaining a high impedance as seen from node SRD, thereby avoiding excess energy consumption.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A circuit, comprising:
   a transformer having a primary winding, a secondary winding, and an auxiliary winding;
   a first switch circuit coupled in series between the primary winding and a first reference node;
   a second switch circuit coupled in series between the secondary winding and a second reference node;
   a first control circuit coupled to the auxiliary winding and configured to actuate the first switch circuit in response to receipt of a wake-up signal so as to cause the primary winding to transmit power to the secondary winding to thereby provide a regulated output signal;
   a second control circuit configured to actuate the second switch circuit in response to an output voltage at the secondary winding being less than a threshold value so as to generate the wake-up signal to the secondary winding for transmission to the auxiliary winding;
   wherein the second switch circuit comprises an integrated circuit having components integrated therein comprising:
      a power transistor having a drain, a source coupled to the second reference node, a gate coupled to the second control circuit, and a substrate,
      a first diode formed from parasitic junctions of the power transistor, the first diode having an anode coupled to the source of the power transistor and a cathode coupled to the drain of the power transistor, the first diode configured to block flow of current from the drain of the power transistor to the source of the power transistor,
      a second diode formed from parasitic junctions of the power transistor, the second diode having an anode coupled to the substrate of the power transistor and a cathode coupled to the drain of the power transistor, the second diode configured to block flow of current from the drain of the power transistor to the substrate of the power transistor,
a third diode having an anode coupled to the secondary winding of the transformer and a cathode coupled to the drain of the power transistor, and
a third switch coupled in parallel with the third diode between the secondary winding of the transformer and the drain of the power transistor, the third switch being configured to be controlled by the second control circuit such that the third switch closes when the power transistor is actuated.

2. The circuit of claim 1, wherein the power transistor comprises a metal oxide semiconductor field effect transistor (MOSFET).

3. The circuit of claim 1, wherein the power transistor comprises a double diffused metal oxide semiconductor (DMOS) transistor.

4. The circuit of claim 1, wherein the transistor, first diode, second diode, third diode, and third switch are integrated components integrated in a same substrate.

5. A circuit, comprising:
a transformer having a primary winding, a secondary winding, and an auxiliary winding;
a first switch circuit coupled in series between the primary winding and a first reference node;
a second switch circuit coupled in series between the secondary winding and a second reference node;
a first control circuit coupled to the auxiliary winding and configured to actuate the first switch circuit in response to receipt of a wake-up signal so as to cause the primary winding to transmit power to the secondary winding to thereby provide a regulated output signal;
a second control circuit configured to actuate the second switch circuit in response to an output voltage at the secondary winding being less than a threshold value so as to generate the wake-up signal to the auxiliary winding for transmission to the auxiliary winding;
wherein the second switch circuit comprises:
a PMOS transistor having a source coupled to the secondary winding of the transformer, a drain coupled to a node, and a gate,
a DMOS transistor having a drain coupled to the node, a source coupled to the second reference node, and a gate coupled to the second control circuit,
a current source coupled to the second reference node, and
a third switch coupled between the current source and the gate of the PMOS transistor and configured to be actuated by the second control circuit.

6. The circuit of claim 5, wherein the second switch circuit further comprises:
a first resistor coupled between the third switch and the node;
a second resistor coupled between the source of the PMOS and the node; and
a junction transistor formed from parasitic junctions of the PMOS transistor, the junction transistor having an emitter coupled to the secondary winding of the transformer, a collector coupled to a substrate of the DMOS transistor, and a base coupled to the node.

7. The circuit of claim 6, wherein the second switch circuit further comprises:
a first diode formed from parasitic junctions of the DMOS transistor, the first diode having an anode coupled to the drain of the DMOS transistor and a cathode coupled to the source of the DMOS transistor, the first diode configured to prevent flow of current from the drain of the DMOS transistor to the source of the DMOS transistor;
a second diode formed from parasitic junctions of the DMOS transistor, the second diode having an anode coupled to the collector of the junction transistor and a cathode coupled to the substrate of the DMOS transistor, the second diode configured to prevent flow of current from the drain of the DMOS transistor to the substrate of the DMOS transistor; and
a capacitor coupled between the node and the substrate of the DMOS transistor.

8. A circuit, comprising:
a transformer having a primary winding, a secondary winding, and an auxiliary winding;
a first switch circuit coupled in series between the primary winding and a first reference node;
a second switch circuit coupled in series between the secondary winding and a second reference node;
a first control circuit coupled to the auxiliary winding and configured to actuate the first switch circuit in response to receipt of a wake-up signal so as to cause the primary winding to transmit power to the secondary winding to thereby provide a regulated output signal;
a second control circuit configured to actuate the second switch circuit in response to an output voltage at the secondary winding being less than a threshold value so as to generate the wake-up signal to the auxiliary winding for transmission to the auxiliary winding;
the second control circuit comprising
a comparison circuit configured to compare a signal from the secondary winding to a reference signal to determine when the output voltage is less than the threshold value, the comparison circuit comprising:
a comparison node,
a current mirror configured to mirror the signal from the secondary winding to the comparison node, and
a current generator configured to draw a reference current related to the reference signal from the comparison node;
a signal generator configured to actuate the second switch circuit after determination by the comparison circuit that the output voltage is less than the threshold value.

9. The circuit of claim 8, further comprising a first inverter having an input coupled to the comparison node and an output, and a second inverter having an input coupled to the output of the first inverter and an output coupled to the second switch circuit.

10. The circuit of claim 8, wherein the current mirror comprises:
a first PNP junction transistor having an emitter coupled to a reference signal node to receive the reference signal, a base, and a collector coupled to the base of the first PNP junction transistor;
a diode having an anode coupled to the collector of the first PNP junction transistor and a cathode;
a resistor coupled between the secondary winding of the transistor and the cathode of the diode;
a second PNP junction transistor having an emitter coupled to the reference signal node, a base coupled to the base of the first PNP junction transistor, and a collector coupled to the comparison node; and
a reference current generator coupled between the collector of the second PNP junction transistor and the second reference node and configured to draw the reference current from the comparison node.

11. The circuit of claim 10, wherein the diode, reference current generator, and resistor are dimensioned such that the reference current is equal to a difference between a voltage at the reference signal node and a sum of a voltage across the diode and a base-emitter voltage of the first PNP junction transistor, divided by a resistance of the resistor.

12. The circuit of claim 8, wherein the comparison circuit further comprises a secondary winding circuit configured to sink a current representative of the signal from the secondary winding; and wherein the current mirror is configured to mirror the current representative of the signal from the secondary winding to the comparison node.

13. The circuit of claim 12, wherein the secondary winding circuit comprises:
   a limiting resistor;
   an input resistor;
   a DMOS transistor having a drain coupled to the secondary winding via the limiting resistor, a source coupled to a first node via the input resistor, and a gate coupled to a turn-on voltage sufficient to turn the DMOS transistor on;
   a first NMOS transistor having a drain coupled to the current mirror to conduct the current representative of the signal from the secondary winding thereto, a source coupled to the first node, and a gate coupled to a reference signal node to receive the reference signal; and
   a first PMOS transistor having a source coupled to the first node, a drain coupled to the second reference node, and a gate coupled to the reference signal node.

14. The circuit of claim 13, wherein the current mirror comprises:
   a second PMOS transistor having a source coupled to a supply node, a drain coupled to the drain of the first NMOS transistor, and a gate coupled to the drain of the second PMOS transistor; and
   a third PMOS transistor having a source coupled to the supply node, a drain coupled to the comparison node, and a gate coupled to the gate of the second PMOS transistor.

15. The circuit of claim 8, further comprising a first inverter having an input coupled to the comparison node and an output, and a second inverter having an input coupled to the output of the first inverter and an output coupled to the second switch circuit.

* * * * *

UNITED STATES PATENT AND TRADEMARK OFFICE
CERTIFICATE OF CORRECTION

| | | |
|---|---|---|
| PATENT NO. | : 9,595,861 B2 | |
| APPLICATION NO. | : 14/754995 | |
| DATED | : March 14, 2017 | |
| INVENTOR(S) | : Tumminaro et al. | |

It is certified that error appears in the above-identified patent and that said Letters Patent is hereby corrected as shown below:

In the Specification
Column 4, Line 62, replace [Dl] with -- D1 --.
Column 5, Line 37, replace [Dl] with -- D1 --.
Column 8, Line 67, replace [Dl] with -- D1 --.
Column 12, Line 11, replace [MQ] with -- M$\Omega$ --.
Column 13, Line 22, replace [R1] with -- Rl --.
Column 13, Line 24, replace [R1] with -- Rl --.
Column 14, Line 5, replace the first term of the equation [lin =] with -- Iin = --.

Signed and Sealed this
Twenty-third Day of May, 2017

Michelle K. Lee
*Director of the United States Patent and Trademark Office*